United States Patent
Faramarzi et al.

[11] Patent Number: 5,722,637
[45] Date of Patent: Mar. 3, 1998

[54] SEALS

[75] Inventors: Jamshid Faramarzi, Foothill Ranch; Curtis G. Sterud, Garden Grove, both of Calif.

[73] Assignee: Control Components, Inc., Rancho Santa Margarita, Calif.

[21] Appl. No.: 653,923

[22] Filed: May 22, 1996

Related U.S. Application Data

[63] Continuation of Ser. No. 399,712, Mar. 3, 1995, abandoned.

[30] Foreign Application Priority Data

Mar. 3, 1994 [GB] United Kingdom .................. 9404063

[51] Int. Cl.$^6$ ........................................... F16K 3/24
[52] U.S. Cl. ............................. 251/190; 251/172
[58] Field of Search ............................ 251/186, 190, 251/172, 189, 191

[56] References Cited

U.S. PATENT DOCUMENTS

| | | | |
|---|---|---|---|
| 3,233,862 | 2/1966 | Marsh | 251/172 |
| 3,680,596 | 8/1972 | Pickett | 251/172 X |
| 3,955,796 | 5/1976 | Grove | 251/172 |
| 4,010,772 | 3/1977 | Palmer et al. | 251/172 X |
| 4,026,515 | 5/1977 | Grove | 251/172 |
| 4,208,035 | 6/1980 | Alvarez et al. | 251/196 |
| 4,911,407 | 3/1990 | Paul, Jr. | 251/172 |
| 5,031,923 | 7/1991 | Davies | 277/124 |
| 5,137,259 | 8/1992 | Stein | 251/174 |

FOREIGN PATENT DOCUMENTS

| | | |
|---|---|---|
| 873384 | 7/1961 | United Kingdom . |
| 1385882 | 3/1975 | United Kingdom . |
| 1601227 | 10/1981 | United Kingdom . |

*Primary Examiner*—John Fox
*Attorney, Agent, or Firm*—Cushman Darby & Cushman Intellectual Property Group of Pillsbury Madison & Sutro LLP

[57] ABSTRACT

A balance seal for a valve, said seal comprising an annular seal element retained within a valve housing. The seal element has a seal well which links with the pressure on one side of the valve to urge a flexible seal leg with a foot into engagement with a moveable valve plug. The seal leg is prevented by an annular retainer from over-deflection.

10 Claims, 3 Drawing Sheets

5,722,637

1
SEALS

This is a continuation of application Ser. No. 08/399,712, filed on Mar. 3, 1995, which was abandoned upon the filing hereof.

FIELD OF THE INVENTION

The present invention relates to seals and more particularly to seals for high temperature situations found for example with superheated steam.

BACKGROUND OF THE INVENTION

It will be appreciated that there is a requirement for seals upon pressure balanced shafts and plugs that may be displaced during operation. A balanced shaft or plug has holes through its length to ensure pressure forces are balanced on either side of the shaft or plug. This significantly reduces the force required to actuate the valve. However a balance seal is required around the plug to prevent upstream pressure causing fluid to leak downstream of the plug. Furthermore, these seals may need to be operative and effective at high temperatures and pressures.

Previously, simple 'o' ring or packed seals have been used to provide balanced seals. For low temperatures ie below 450° F. (230° C.) these seals are made from polytetrafluorethylene. Higher temperature environments are presently catered for using laminated graphite. However, laminated graphite is prone to wear and has an insufficient operational life span for pressures over 10 Mpa.

Typically, a balanced plug will be located in a pipe or ducting system in order to control fluid flow by essentially blocking that flow to varying degrees. These plugs are quite sturdy blocks of metal and moved by rods into or out of the fluid flow. The seals act against the sides of the plug.

SUMMARY OF THE INVENTION

It is an objective of the present invention to provide a seal for high temperature environments suitable for pressure balanced plug or shaft assemblies.

In accordance with the present invention there is provided a seal for balanced pressure valve arrangements, the seal comprising a seal element for securing in a valve housing and a retainer located upon the surface of the housing, the seal element including a seal well and a seal leg, the seal well being deformed under the application of pressure such that the seal leg is forced into sealing engagement with a valve plug surface, the retainer being arranged to limit the degree of seal leg deflection toward the valve plug surface when the valve is opened. Preferably a foot extends from the end of the leg to make the desired sealing engagement with the valve plug surface.

Preferably, the valve plug has a tapered or ramped section to its surface. The ramp may be 10° to the vertical.

The seal may be made of a nickel/chromium/iron alloy such as Inconel metal and the amount of deflection of the seal leg permitted by the retainer can be such as to prevent the seal becoming permanently deformed.

Preferably, the seal element is sealed into the valve housing with a spiral wound metal and graphite gasket.

The seal element may be inverted to provide an inverse seal arrangement. Two seals may be arranged together to provide bi-directional sealing.

BRIEF DESCRIPTION OF THE DRAWINGS

An embodiment of the present invention will now be described by way of example only with reference to the accompanying drawings in which.

DESCRIPTION OF THE PREFERRED EMBODIMENTS

Figure 1:
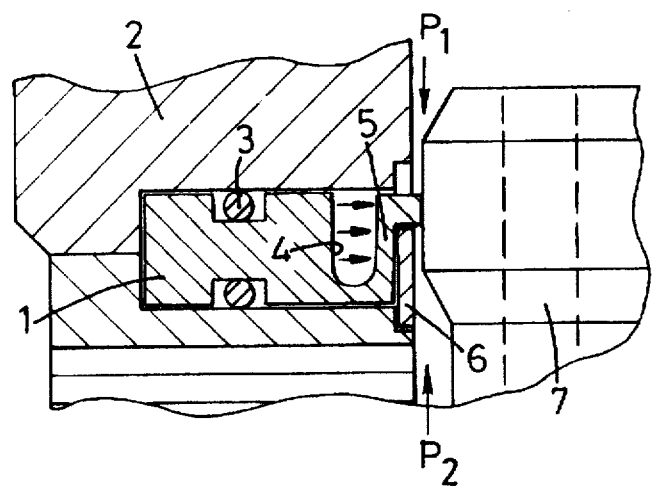
FIG. 1 illustrates in schematic form a seal in a closed configuration.

Consider FIG. 1. A seal assembly is shown in a closed configuration. A seal member 1 is located in a recess of a valve housing 2. The seal member 1 is made of Inconel metal or similar material and respectively sealed in the recess by an 'o' ring 3.

The seal member 1 includes a pressure well 4 which is arranged to distort under pressure P1 such that a seal leg 5 and its foot 5A are forced away from the seal member 1. A seal retainer 6 is provided to contain seal leg 5 movement to within desired parameters and so ensure it is not overstressed.

The present invention relates to a seal for a wide range of differential pressure situations. Thus, pressure $P_1$ is substantially greater than the reverse pressure $P_2$. Pressure $P_2$ acts through the gap provided between the plug 7 and housing 2 in the closed configuration illustrated in FIGS. 1 and 6. The initial seal between pressure $P_1$ and $P_2$ is caused by the plug distorting the leg 5. The pressure $P_1$ additionally loads the foot 5A of seal leg 5 into contact with the plug 7. This contact provides a good reliable seal.

Figure 2:
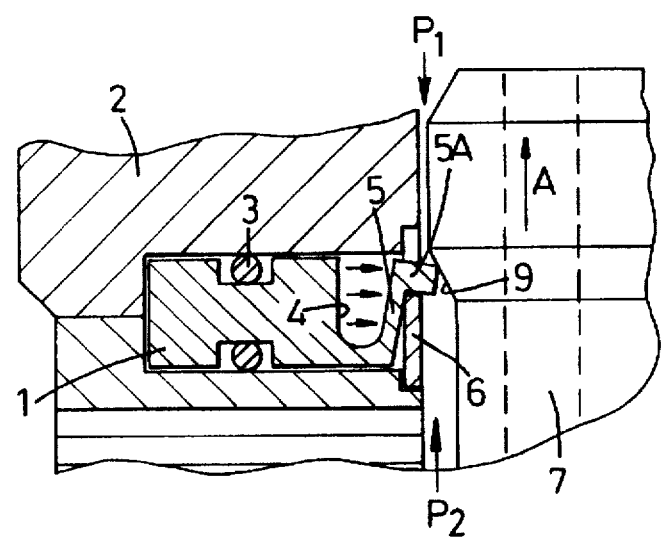
FIG. 2 illustrates the seal of FIG. 1 at a transient stage of opening.

FIG. 2 illustrates the seal assembly as illustrated in FIG. 1 in an intermediate or transient stage of opening. The plug 7 is moved by a rod 20 (seen in FIG. 6) in the direction of the arrowhead A.

As the plug 7 moves to an open position, the foot 5A of seal leg 5 is held against the plug by pressure P1. The plug 7 has a ramp or shoulder 9 to which the foot 5A remains in compressive, sealing, engagement until further deflection of the leg 5 is prevented by the retainer 6. As the plug 7 continues to move in the direction of the arrowhead A, the foot 5A of the seal leg 5 is lifted off the plug 7. Thus it will be appreciated that the seal becomes disengaged from the plug and has adequate strength to remain in place and to re-engage when the plug moves in the opposite direction and must withstand a continuing series of engagements and disengagements.

Figure 3:
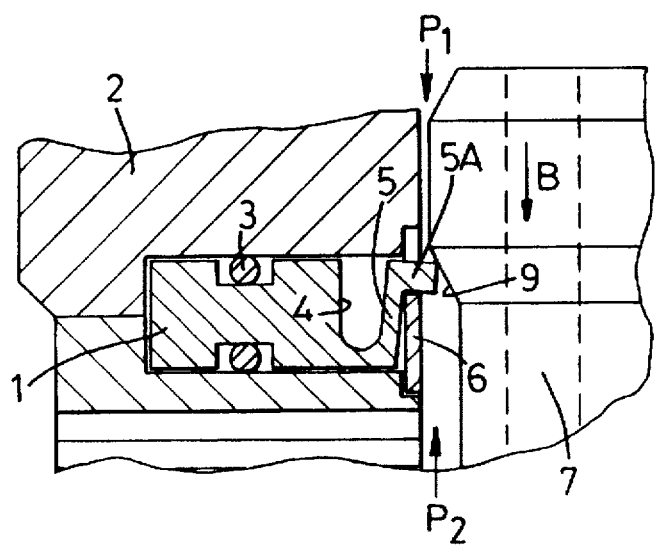
FIG. 3 illustrates the seal of FIG. 1 at a transient stage of closing.

FIG. 3 illustrates the seal assembly as illustrated in FIG. 1 in an intermediate or transient stage of closing. The plug 7 is moved by rod 20 in the direction of arrowhead B.

The seal leg 5 is arranged to be held at a position by the retainer 6 such that its foot 5A will impinge upon the plug 7. The ramp or shoulder 9 acts to smoothly deflect the leg 5 as the plug 7 is moved in the direction of the arrowhead B. After contact with the ramp 9, the foot 5A of leg 5 slides against the body of the plug 7. Pressure P1 acts to distort well 4 and the leg 5 and foot 5A provide a closed seal against the plug 7.

There is an intimate contact between the plug 7 and seal provided by the interferance of foot 5A against the plug sealing surfaces and the contact force is increased by the pressure-induced deflection of leg 5. The initial contact as the foot 5A moves up the ramp 9 is to provide a positive shut off between pressure areas $P_1$ and $P_2$. Thus, the pressure differential augments the required seal. The seal may be of different dimensions for different levels of pressure difference between $P_1$ and $P_2$. The sealing force is independent of pressure difference, the radial deflection augments sealability.

The retainer 6 is incorporated in the arrangement so the seal will unseat as the valve is opened.

In the closed position (see FIG. 1) the system pressure acts on the seal to provide additional sealing load against the plug 7. Initial sealing load is due to the seal interference fit; ie the seal is stretched over the plug.

The generally "G" shaped sealing element 1 is flexible. When the plug 7 is moved up to open the valve, the system pressure holds the "G" seal tight against the plug 7. As the "G" seal is sliding against the plug 9 it still maintains contact at the angle where the plug diameter is diminishing. The lip of retainer 6 is positioned so that at about 0.020" (0.5 mm) deflection inwardly (of the "G" seal), the retainer 6 is contacted and the additional support of the retainer 6 holds the "G" seal. As the plug 7 continues to open, and the "G" seal contact point on the plug ramp 9 is diminishing, the retainer 6 gives additional stiffness to the "G" seal so system pressure cannot maintain "G" seal in contact with the plug. The "G" seal unseats and the plug moves open freely.

Without the retainer 6 the "G" seal would deflect inward too far and be overstressed. The retainer 6 may be an integral extension of another part or a ring as shown by the figures in the specification. The purpose is served by either design.

The angle of ramp 9 is typically 10° to the vertical. However, it will be appreciated that other angles could be used dependent upon operational requirements. The foot 5A conveniently impinges upon the plug by 0.005". The thickness of leg 5 must be as thin as possible for flexibility but strong enough to withstand the pressure differential from $P_1$ and $P_2$. Reducing the strength of the leg 5 and its foot 5A will increase the seal flexibility but decrease the seal durability, and thus a lower contact force between the plug and seal.

Figure 4:
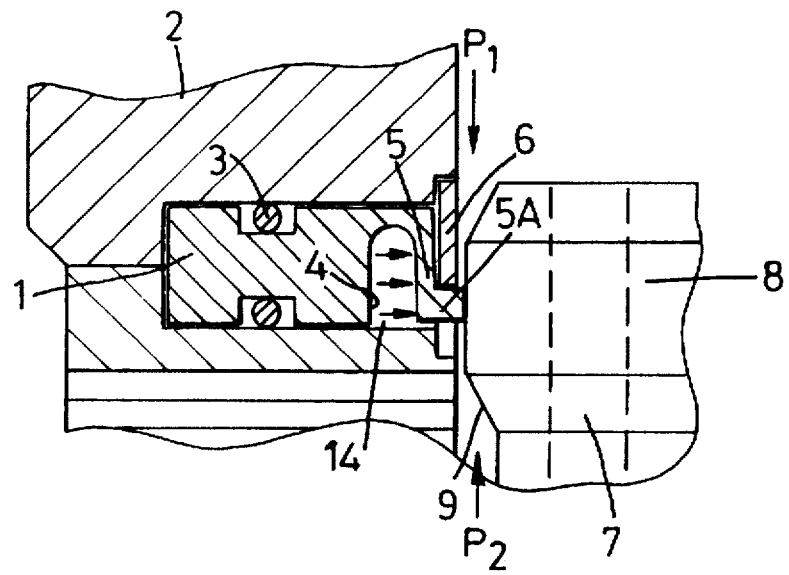
FIG. 4 illustrates a seal in accordance with the present invention in an inverse configuration.

It will be understood that the present seal is unidirectional. However, it will be appreciated as illustrated in FIG. 4 the seal assembly could be inverted to provide a reverse flow seal arrangement. In this case pressure $P_2$ must be greater than $P_1$. The seal operates as described with reference to FIGS. 1 to 3 but reverse pressure P2 provides the deformation force to a seal well 14.

Figure 5:
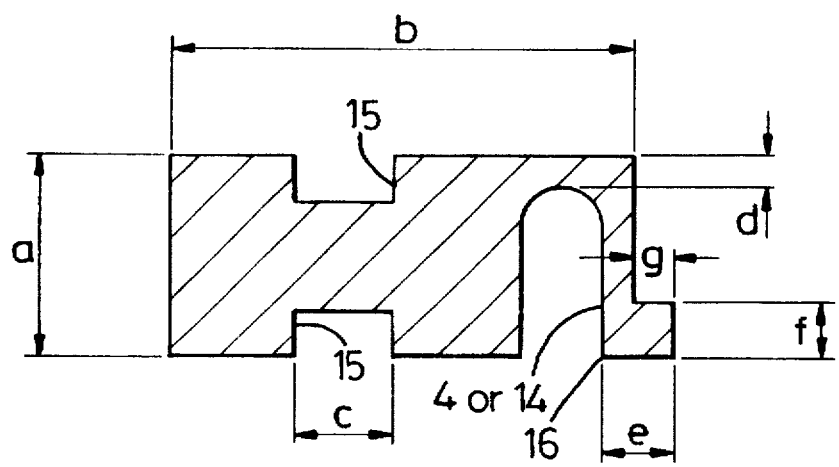
FIG. 5 illustrates a seal member.

FIG. 5 illustrates in cross-section the seal member 1. The member 1 is machined from a block of metal such as Inconel although other materials may be used. Inconel is preferred due to its fatigue strength. The member 1 has recesses 15 to accommodate seals such as 'o' rings when mounted in a housing. Typically, the member 1 is arranged to have a broader face than depth to ensure the seal when mounted in a housing has a degree of stability.

The well 4 or 14 has a depth and dimension dependent upon the fabrication material and degree of deflection required to the leg 5 to ensure a good seal. Similarly, the leg 5 and its foot 5A are designed to provide a good seal against a plug surface. The foot 5A is also shaped to slide over the plug ramp surface. In order to adjust seal resilience it is possible to shave or add material to the foot corner 16. The radius in the bottom of well 4 is to eliminate stress concentration and therefore significantly extend the fatigure life of the seal. The Young's Modulus of the fabrication material is a key property of the design calculation. It is important to the resultant seal deflection due to static stretching of the seal and so sealing force due to pressure.

The dimensions of the typical seal element would be as follows (letters as marked on FIG. 5):

a=6.38"
b=1.06"
c=0.32"
d=0.07"
e=0.13"
f=0.10"
g=0.07"

The well 4 or 14 bottom radius is 0.06" and it is designed that the leg 5 will be deflected 0.02" under pressure load as it is restrained by the retainer 6. The seal may have corners chamfered at 15° to the vertical.

Figure 6:
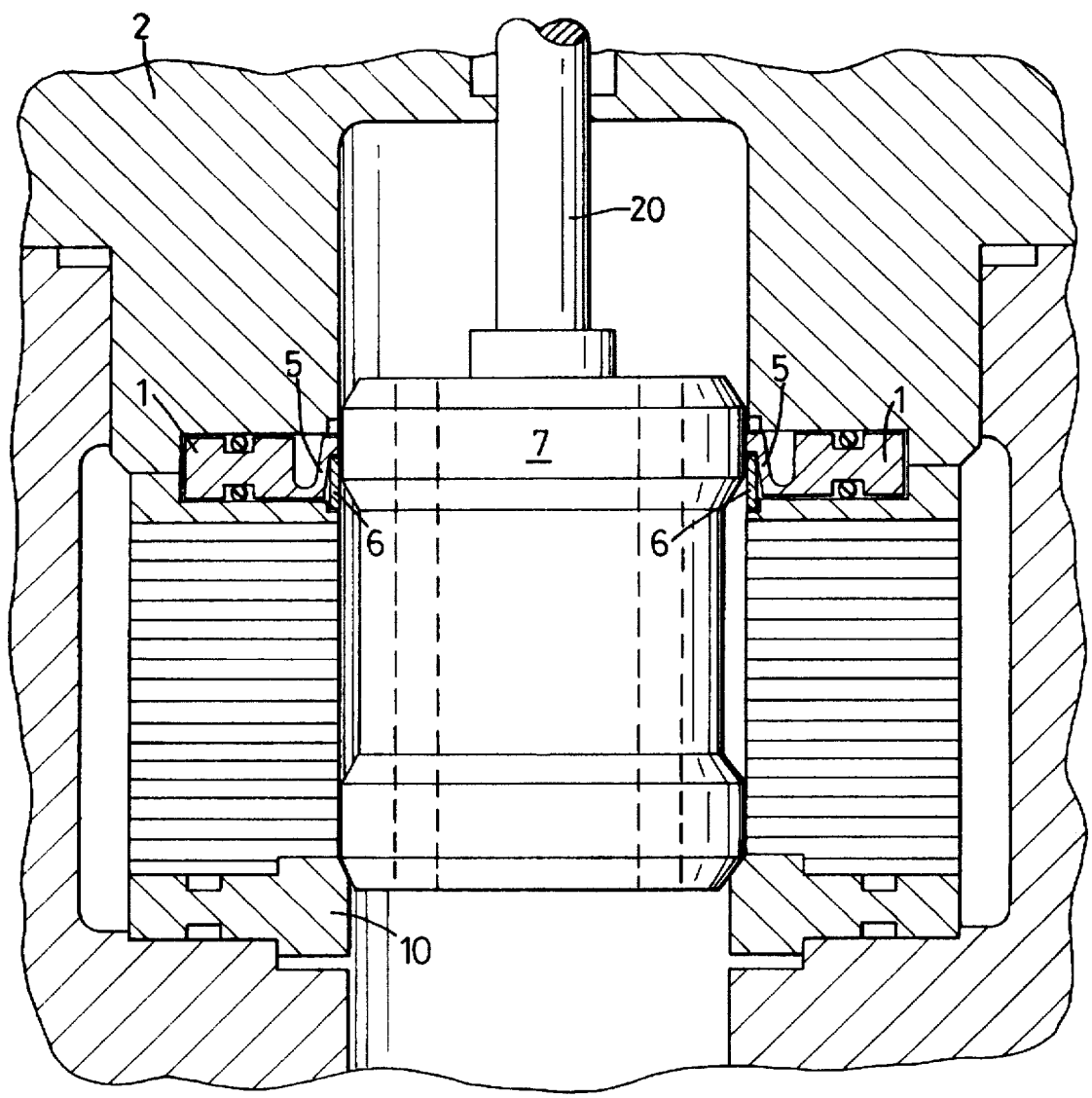
FIG. 6 shows a seal according to the invention positioned generally within a valve arrangement.

In FIG. 6, the seal member 1 is shown positioned in a severe service valve of the general type known as a "DRAG" (Registered Trade Mark) valve manufactured by Control Components Inc of California, USA, features of which are illustrated in U.S. Pat. Nos. Re issue 32197 or 3,514,074 which are hereby incorporated by reference. The location of the seal member 1 and its seal leg 5 can be seen adjacent the surface of the plug 7 of the valve. Plug 7 is moveable towards and away from a seat ring 10 to close and open the valve. FIG. 6 shows the valve in its closed position.

We claim:

1. A seal for balanced pressure valve arrangements, the seal comprising a seal element adapted to be retained in a valve housing, the seal element being machined from a block of metal to include an annular seal well and a central aperture to receive a valve plug for said housing, said annular well extending around said aperture, the bottom of the well being radiused, and said annular well being separated from said aperture by an annular seal leg, the radially outer surface of said seal leg defining the radially inner surface of said well, wherein the seal well deforms under the application of pressure such that a portion of the seal leg is forced into sealing engagement with a surface of the valve plug, and a retainer is located upon the surface of the housing, the retainer being arranged to limit the degree of radially inward seal leg deflection toward the valve plug surface when the valve is opened.

2. A seal according to claim 1, wherein a foot extends from the end of the leg furthest from the bottom of the well to make the desired sealing engagement with the valve plug surface.

3. A seal as claimed in claim 1 wherein the valve plug has a tapered or ramped section to its surface.

4. A seal as claimed in claim 3, wherein the ramp section is 10° to the vertical axis of the seal.

5. A seal as claimed in claim 1, in which the seal element is made from a nickel/chromium/iron alloy such as Inconel metal.

6. A seal as claimed in claim 1 wherein the seal element is inverted to provide an inverse seal arrangement such that a seal is provided in the opposite direction relative to movement of the plug.

7. A seal arrangement comprising one seal as claimed in claim 1, and another such seal wherein the seal element is inverted to provide an inverse seal arrangement such that a seal is provided in the opposite direction relative to movement of the plug, so as to provide a bi-directional seal for a valve.

8. A balanced pressure valve incorporating at least one balance seal, said seal comprising a seal element adapted to be retained in the housing of said valve, the seal element being machined from a block of metal to include an annular seal well and a central aperture to receive a valve plug for said housing, said annular well extending around said aperture, the bottom of the well being radiused, and said annular well being separated from said aperture by an annular seal leg, the radially outer surface of said seal leg defining the radially inner surface of said well, wherein the seal well deforms under the application of pressure such that a portion of the seal leg is forced into sealing engagement with a surface of the valve plug, and a retainer is located upon the surface of the housing, the retainer being arranged to limit the degree of radially inward seal leg deflection toward the valve plug surface when the valve is opened.

9. A seal for balanced pressure valve arrangements, the seal comprising a seal element adapted to be retained in a valve housing in an interference fit over a valve plug for said housing, the seal element being machined from a block of metal to include an annular seal well and a central aperture to receive said valve plug, said well extending around said aperture, the bottom of the well being radiused, and said annular well being separated from said aperture by an annular seal leg, the radially outer surface of said seal leg defining the radially inner surface of said well, wherein the seal well deforms under the application of pressure such that a portion of the seal leg is forced into sealing engagement with a surface of the valve plug, and a retainer is located upon the surface of the housing, the retainer being arranged to limit the degree of radially inward seal leg deflection toward the valve plug surface when the valve is opened.

10. A seal as claimed in claim 2, wherein the plug has a tapered or ramped section to its surface.

* * * * *